United States Patent
Ahmed

(10) Patent No.: US 7,350,002 B2
(45) Date of Patent: Mar. 25, 2008

(54) ROUND-ROBIN BUS PROTOCOL

(75) Inventor: Yasser Ahmed, Macungie, PA (US)

(73) Assignee: Agere Systems, Inc., Allentown, PA (US)

( * ) Notice: Subject to any disclaimer, the term of this patent is extended or adjusted under 35 U.S.C. 154(b) by 235 days.

(21) Appl. No.: 11/008,745

(22) Filed: Dec. 9, 2004

(65) Prior Publication Data

US 2006/0129725 A1   Jun. 15, 2006

(51) Int. Cl.
*G06F 13/00* (2006.01)

(52) U.S. Cl. .................... 710/108; 710/111; 710/119

(58) Field of Classification Search ......... 710/108–125
See application file for complete search history.

(56) References Cited

U.S. PATENT DOCUMENTS

| | | | | |
|---|---|---|---|---|
| 3,813,651 | A * | 5/1974 | Yamada ..................... | 710/107 |
| 4,438,520 | A | 3/1984 | Saltzer | |
| 4,570,220 | A * | 2/1986 | Tetrick et al. .............. | 710/306 |
| 4,570,257 | A | 2/1986 | Olson et al. | |
| 4,658,353 | A * | 4/1987 | Whittaker et al. .......... | 709/253 |
| 4,799,052 | A | 1/1989 | Near et al. | |
| 5,450,404 | A | 9/1995 | Koopman et al. | |
| 5,524,215 | A | 6/1996 | Gay | |
| 5,535,212 | A | 7/1996 | Koopman et al. | |
| 5,537,549 | A | 7/1996 | Gee et al. | |
| 5,551,052 | A | 8/1996 | Barnes et al. | |
| 5,671,373 | A | 9/1997 | Prouty et al. | |
| 5,832,242 | A | 11/1998 | Gulick | |
| 5,883,478 | A * | 3/1999 | Thesling .................... | 318/119 |
| 5,884,053 | A * | 3/1999 | Clouser et al. ............. | 710/312 |
| 5,896,399 | A * | 4/1999 | Lattimore et al. .......... | 714/721 |
| 5,901,146 | A | 5/1999 | Upp | |
| 5,911,052 | A | 6/1999 | Singhal et al. | |
| 6,104,724 | A | 8/2000 | Upp | |
| 6,415,369 | B1 | 7/2002 | Chodneckar et al. | |
| 6,895,482 | B1 * | 5/2005 | Blackmon et al. .......... | 711/158 |
| 2004/0184572 | A1 * | 9/2004 | Kost et al. .................. | 375/354 |

OTHER PUBLICATIONS

Philips Semiconductors. PDI1394P11 3-port physical layer interface. Product Specification Data Sheet. Apr. 9, 1999.*
Wasaki, Katsumi. A Formal Verification Case Study for IEEE-P.896 Bus Arbiter by using A Model Checking Tool. International Journal of Computer Science and Network Security. vol. 7, No. 3. Mar. 2007.*
Atmel Corporation. Two-Wire Peripheral Expansion for the AT89C2051 Microcontroller. Application Note. Dec. 1997.*
PCI Local Bus Specification—Revision 2.2; Dec. 18, 1998—322 pges.

* cited by examiner

*Primary Examiner*—Mark H. Rinehart
*Assistant Examiner*—Matthew Spittle

(57) ABSTRACT

A low-latency, peer-to-peer TDM bus including one or more data lines and one or more control lines is provided. Attached devices access the bus sequentially in order of their bus addresses. During a device's access period, if the device has data to transmit, the device places its address on the data lines, asserts a START signal on the bus, and proceeds to transmit data to the other devices on the bus. When the data transmission is completed, the device asserts an END signal on the bus, thus passing control of the bus to the next device in the sequence. If the device has no data to transmit, the device simply places its address on the data lines, asserts the START signal, and asserts the END signal, and control passes directly to the next device in line. In this manner, each device has an opportunity to transmit on the bus.

28 Claims, 4 Drawing Sheets

ROUND-ROBIN BUS PROTOCOL

FIELD OF THE INVENTION

The present invention relates generally to a time division multiplexed (TDM) bus for communication among circuits in an integrated circuit, circuit board, or computer system.

BACKGROUND OF THE INVENTION

Numerous computerized devices are utilized by consumers throughout the world. In each of these devices, digital data are passed between individual components, often using a shared time-division multiplexed (TDM) bus, either serial and/or parallel, between the components. The data stream on the TDM bus comprises a repeating data cycle or frame, with each data frame being divided into multiple time slots. Each component is granted access to the bus during a certain time slot.

As is well-known in the prior art, the TDM bus typically utilizes an "arbiter" circuit, or master controller, that controls which component has access to the bus at a given time. The conventional master controller assigns the use of the TDM bus to the various components in accordance with a given set of arbitration rules, e.g., a round-robin allocation or an interrupt-driven access resulting in a first come, first served allocation. Flexibility is provided in such conventional devices by allowing the controller to change the duration of the TDM slot, or the number of TDM slots, allocated to any particular component.

Disadvantageously, conventional system bus arbitration can require substantial resources or overhead of the master controller. This is particularly true in multiple processor-based systems, where communication data traffic between the processors increases as requests for access to the arbitrated system bus increase. Moreover, as the size of systems increases and as the number of agents on a particular system bus grows, the arbitration processing becomes enormous. This increased overhead results in a decreased amount of processing available for other tasks. There is thus a need for a more flexible TDM system bus that does not require the significant overhead otherwise conventionally required in a master controller.

BRIEF SUMMARY OF THE INVENTION

The invention provides a low-latency, peer-to-peer TDM bus and associated bus protocol by which multiple devices may communicate without the presence of a bus master controller. The bus comprises one or more data lines and one or more control lines. In accordance with the invention, each device is assigned a unique binary address, and the devices access the bus sequentially in order of their bus addresses. During a given device's access period, assuming that the device has data to transmit, the device places its address on the data lines, asserts a START signal on the bus, and proceeds to transmit data to the other devices on the bus. When the data transmission is completed, the device asserts an END signal on the bus, thus passing control of the bus to the next device in the sequence. If the device has no data to transmit, the device simply places its address on the data lines, asserts the START signal, and asserts the END signal, and control passes directly to the next device in line. In this way, each device is given an opportunity to transmit on the bus, without interference from other devices, and without the need for a master bus controller to arbitrate between the devices.

The invention may thus be described as a method for a first device to transmit a message to a second device via a digital bus comprising one or more control lines and one or more data lines, each device having a bus address and the digital bus having clock cycles, the method comprising the steps of: (1) receiving a bus seize signal originating from a device other than the first device; (2) receiving a predetermined bus address originating from the device other than the first device; (3) receiving a bus release signal originating from the device other than the first device; (4) responsive to the receipt of the bus seize signal, the predetermined bus address and the bus release signal, seizing the digital bus; wherein the device other than the first device is not a bus arbiter. Preferably, the seizing of the bus comprises the steps of (4a) asserting the bus address of the first device on the one or more data lines and (4b) asserting a bus seize signal on the one or more control lines.

In further accordance with the invention, each device comprises a bus driver circuit, a bus monitor circuit, and an interface control circuit, collectively configured to implement the protocol described above. More particularly, the invention provides a bus interface circuit for transmitting a message from a first device to a second device via a digital bus comprising one or more control lines and one or more data lines, each device having a bus address, the bus interface circuit comprising: (a) a bus monitor circuit connected to the one or more data lines and the one or more control lines of the digital bus; (b) a bus driver circuit connected to the one or more data lines and the one or more control lines of the digital bus; and (c) an interface control circuit, connected to the bus monitor circuit and to the bus driver circuit; wherein the bus interface control circuit is configured to cause the bus driver circuit to seize the digital bus in response to the bus monitor receiving a predetermined bus address originating from a device other than the first device, a bus seize signal originating from the device other than the first device, and a bus release signal originating from the device other than the first device, wherein the device other than the first device is not a bus arbiter. Preferably, the bus interface control circuit is configured to cause the bus driver circuit to seize the digital bus by asserting the bus address of the first device on the one or more data lines and asserting a bus seize signal on the one or more control lines.

The invention may further be described as a digital bus for interconnecting at least two devices without the presence of a bus arbiter, the digital bus consisting of: (a) a first control line for carrying at least one of a bus seize signal and a bus release signal; and (b) one or more data lines for carrying a bus address associated with a device having control of the digital bus and for carrying data to be transferred between devices connected to the digital bus. Preferably, the digital bus further consists of (c) a second control line for carrying at least one of a bus seize signal and a bus release signal. The digital bus may also include (d) a clock line for carrying a clock signal.

BRIEF DESCRIPTION OF THE DRAWINGS

Various embodiments of the present invention will now be described in detail in conjunction with the annexed drawings, in which.

DETAILED DESCRIPTION OF THE INVENTION

Figure 1:
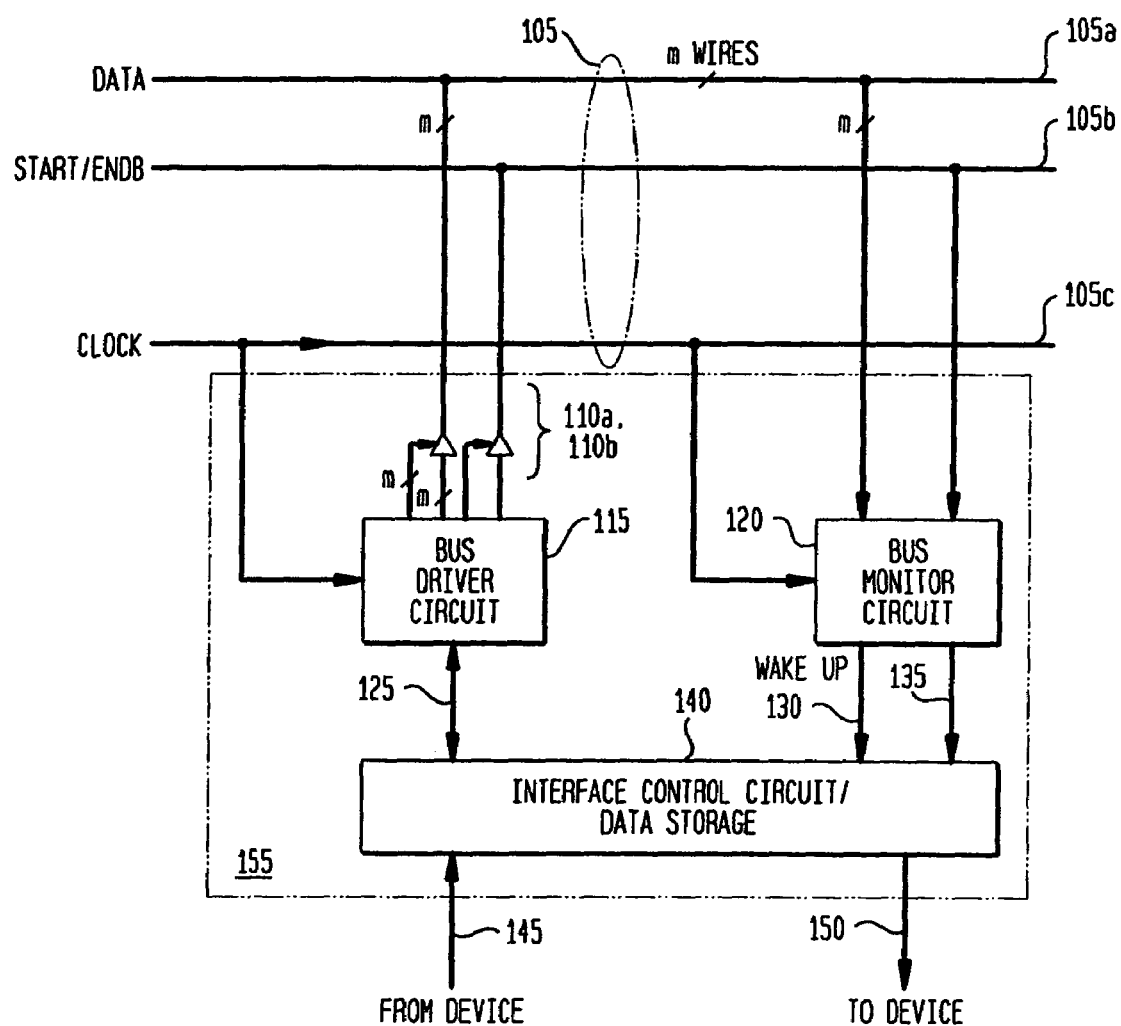
FIG. 1 is a block diagram of an exemplary digital bus and associated interface circuitry according to an embodiment of the invention.

The present invention describes a digital bus and associated bus interface circuit for exchanging data between n devices in an integrated circuit, circuit board, or computer system. With reference to FIG. 1, an embodiment of a digital bus 105 according to the invention includes m data lines 105a and a control line 105b. Preferably, the number of devices connected to the bus is less than or equal to $2^m$, where m is the number of data lines 105a, such that a binary representation of each device's bus address may be transmitted on the data lines 105a in a single clock cycle of the bus.

Each device connected to bus 105 has an associated bus interface circuit 155. Bus interface circuit 155 includes a bus driver circuit 115 connected via tri-state buffers 110a, 110b to data lines 105a and control line 105b, respectively. It further includes a bus monitor circuit 120, connected to the data lines 105a and control lines 105b. Bus monitor circuit 120 is responsible for continuously monitoring the signals on the data and control lines and for receiving any signals that are directed to the device.

In a preferred embodiment, bus 105 further includes a clock line 105c that distributes a bus clock signal to bus driver circuit 115 and bus monitor circuit 120. Alternatively, a local clock of an appropriate frequency may be generated in bus interface circuit 155 and digitally phase locked to the data on the data lines.

Bus interface circuit 155 further includes an interface control circuit 140 that receives incoming data signals from bus monitor circuit 120 via connection 135 and passes them to the device on lines 145. Interface control circuit 140 further receives outgoing data signals from the device on lines 150 and passes them to the bus driver circuit 115 via connection 125 for transmission onto the digital bus 105. Interface control circuit 140 preferably also is connected to bus monitor circuit 120 via a wake-up line 130 by which interface control circuit 140 may be "awoken" when bus monitor circuit 120 receives a predetermined signal from digital bus 105. Interface control circuit 140 preferably also includes a data storage memory (not shown) for temporarily storing incoming and outgoing data.

Bus driver circuit 115, bus monitor circuit 120 and interface control circuit 140 may be implemented using standard I/O integrated circuits of the type conventionally used to implement various computer bus protocols.

The general operation of bus 105 in one embodiment of the invention will now be described. As described above, devices connected to bus 105 access it sequentially in order of their bus addresses. During a given device's access period, assuming that the device has data to transmit, the device places its address on the data lines 105a, asserts a bus seize (or START) signal on control line 105b, and proceeds to transmit data to the other devices on the bus. Preferably, the bus seize signal and the bus address are transmitted in a single clock cycle of the digital bus.

When the data transmission is completed, and preferably during the last cycle of the data transmission, the device asserts bus release (or END) signal on control line 105b, thus passing control of the bus to the next device in the sequence. If the device has no data to transmit, the device simply places its address on the data lines 105a, asserts the START signal and then the END signal on control line 105b, and control passes directly to the next device in line. It should be noted that in accordance with the invention the bus release signal is asserted either at the same time as the bus seize signal or at some time t after the bus seize signal, without the intervention of any other signals on control line 105b.

Figure 2:
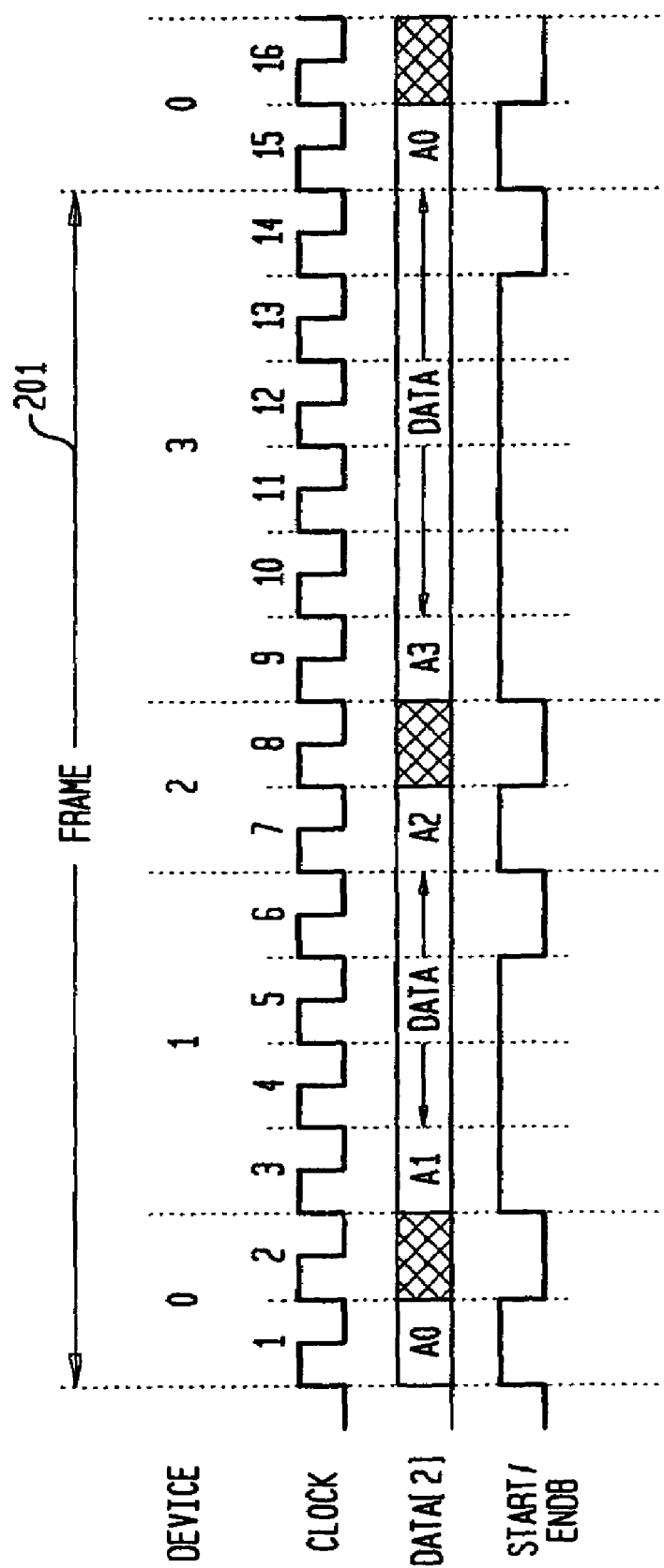
FIG. 2 is a timing diagram illustrating exemplary bus signals according to an embodiment of the invention.

FIG. 2 is a timing diagram illustrating the exemplary operation of a digital bus 105 connecting four devices via a clock line CLOCK, two data lines DATA[2], and a control line START/ENDB. Each device is connected via a bus interface circuit 155 as shown in FIG. 1. In accordance with the invention, each of the four devices is assigned a numerical bus address (e.g., 0, 1, 2, or 3). It should be noted that in this example the quantity of devices (four) is equal to the value $2^m$, where m is the quantity of data lines (two), such that the address of any of the devices may be placed on the bus within a single clock cycle of the bus.

It may be seen from FIG. 2 that the four devices sequentially share the bus in accordance with a time-division-multiplexed (TDM) scheme, in which each device has control of the bus during a particular time slot. In the instant example, a single frame of the TDM scheme includes time slots 0, 1, 2 and 3, corresponding to devices 0, 1, 2, and 3.

More particularly, in the example in FIG. 2, devices 1 and 3 have data to be transmitted, while devices 0 and 2 do not. When the system containing devices 0, 1, 2 and 3 is powered up, the device having the lowest bus address (e.g., device 0) is responsible for initiating the TDM sequence on the bus. Thus, during clock cycle 1, device 0 starts the cycle by placing its own address (address 0, or binary 00) onto the data lines of the bus and by transmitting a logical HIGH value (binary 1) on the control line, representing a START signal. In this manner, device 0 informs devices 1, 2, and 3 that it has control of the bus. In clock cycle 2, because device 0 has no need to transmit any data on the bus in the instant example, it indicates as much to the other devices by transmitting a logical LOW value (binary 0) on the control line, representing an END signal. Further, because device 0 has no data to transmit, the data lines in clock cycle 2 are placed in a tri-state condition, shown by the hatched pattern in FIG. 2.

Meanwhile, device 1 has been monitoring the signals on the bus during clock cycles 1 and 2. During clock cycle 1, device 1 receives the address of device 0 on the data lines and the START signal on the control line. Having observed the rising edge of the pulse on the control line and received the particular address (address 0) on the data lines in the first clock cycle after that rising edge, the interface logic in bus interface circuit 155 in device 1 recognizes that device 0 has asserted control of the bus. Similarly, during clock cycle 2, device 1 receives the END signal on the control line and thus recognizes that device 0 has relinquished control of the bus.

Accordingly, in clock cycle 3, device 1 transmits its own bus address (address 1) on the data lines and asserts the START signal on the control line. Because device 1 has data to transmit, in clock cycles 4-6, it then proceeds to transmit its data, maintaining the START signal high during clock cycles 4 and 5. During clock cycle 6, the last cycle of the data transmission, device 1 relinquishes the START signal and asserts the END signal, thereby informing the other devices that it has completed its data transfer and has no further need for the bus. It should be noted that in the present invention, data transmission may continue through the clock cycle in which the END signal is asserted (i.e., data transmission throughout clock cycles 4-6). Alternatively, the END signal may be asserted only after the data transmission is completed. If so, assuming that the END signal is asserted in clock cycle 6, the data transmission would occur only during clock cycles 4 and 5, and the data lines during clock cycle 6 would be tri-stated.

Next, control of the bus passes to device 2. Device 2 has observed the rising edge of the START pulse from device 1, received the preceding address (address 1) on the data lines in the first clock cycle after that rising edge in clock cycle 3, and also observed the low signal on the control line in clock cycle 6. Device 2 thus recognizes that device 1 has asserted, and relinquished, control of the bus. Accordingly, in clock cycle 7, device 2 places its bus address (address 2, or binary 10) onto the data lines of the bus and asserts the START signal on the control line. Because device 2 has no data to transfer, in clock cycle 8 device 2 asserts the END signal on the control line, and control of the bus passes to device 3.

Device 3 has control of the bus in clock cycles 9-14. Particularly, in clock cycle 9, device 3 seizes control of the bus by asserting the START signal and transmitting its bus address (address 3) on the data lines. During clock cycles 10-14, device 3 transfers its data via the data lines. Note that device 3 maintains the START signal during clock cycles 10-13 but transitions it to the END signal during clock cycle 14.

In clock cycles 15 and 16, control returns to device 0. Device 0 once again transmits its address on the data lines during clock cycle 15 and asserts the START signal during clock cycle 15. Having no data to transmit, in clock cycle 16 device 0 asserts the END signal on the control line.

In the embodiment described above, the bus seize signal (START) and the bus release signal (END) are signals of opposite polarity on the same control line, wherein the bus seize signal (START) is represented as a logical HIGH value and the bus release signal (END) is represented as a logical LOW value. It should be understood, however, that these signals may also be represented using the reverse polarities to those described above. If so, then the bus seize signal (START) would be represented by a logical LOW value on the control line, while the bus release signal (END) would be represented by a logical HIGH value. Indeed, in this alternative, it would not be necessary for a device seizing the bus to affirmatively assert a low bus seize (START) signal on the bus, provided that the previous device, at the end of its time slot, asserts and releases its high bus release (END) signal, such that the control line returns to a low state. Accordingly, the phrase "asserting a bus seize signal" as used herein should to be understood to encompass both the situation in which a device raises the control line from a logical LOW state to a logical HIGH state and also the situation in which a device allows the control line to remain in a logical LOW state.

Figure 3:
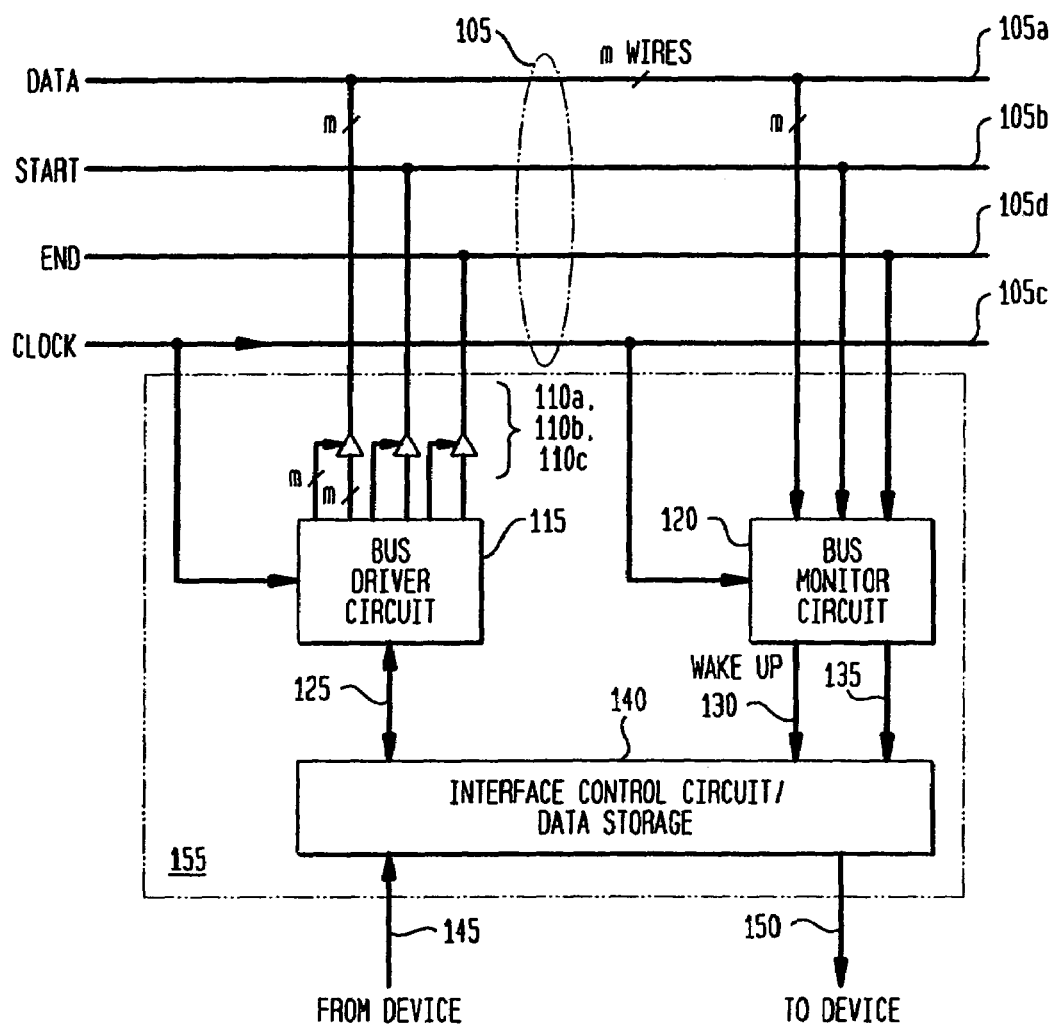
FIG. 3 is a block diagram of an exemplary digital bus and associated interface circuitry according to an alternative embodiment of the invention.

In another embodiment of the present invention, digital bus 105 may also include control lines in addition to the previously identified control line 105*b*. For example, FIG. 3 is a block diagram depicting an embodiment of the present invention in which digital bus 105 includes an additional control line 105*d* connected to bus monitor circuit 120 and connected to bus driver circuit 115 via an additional tri-state buffer 110*c*. In such an embodiment, the first control line 105*b* may be used to indicate the bus seize, or START, signal, while the second control line 105*d* may be used to indicate the bus release, or END, signal. Advantageously, in this embodiment a device having no data to transmit may assert both the START and the END signals during the same clock cycle, thus indicating within a single clock cycle that it has no data to transmit.

Figure 4:
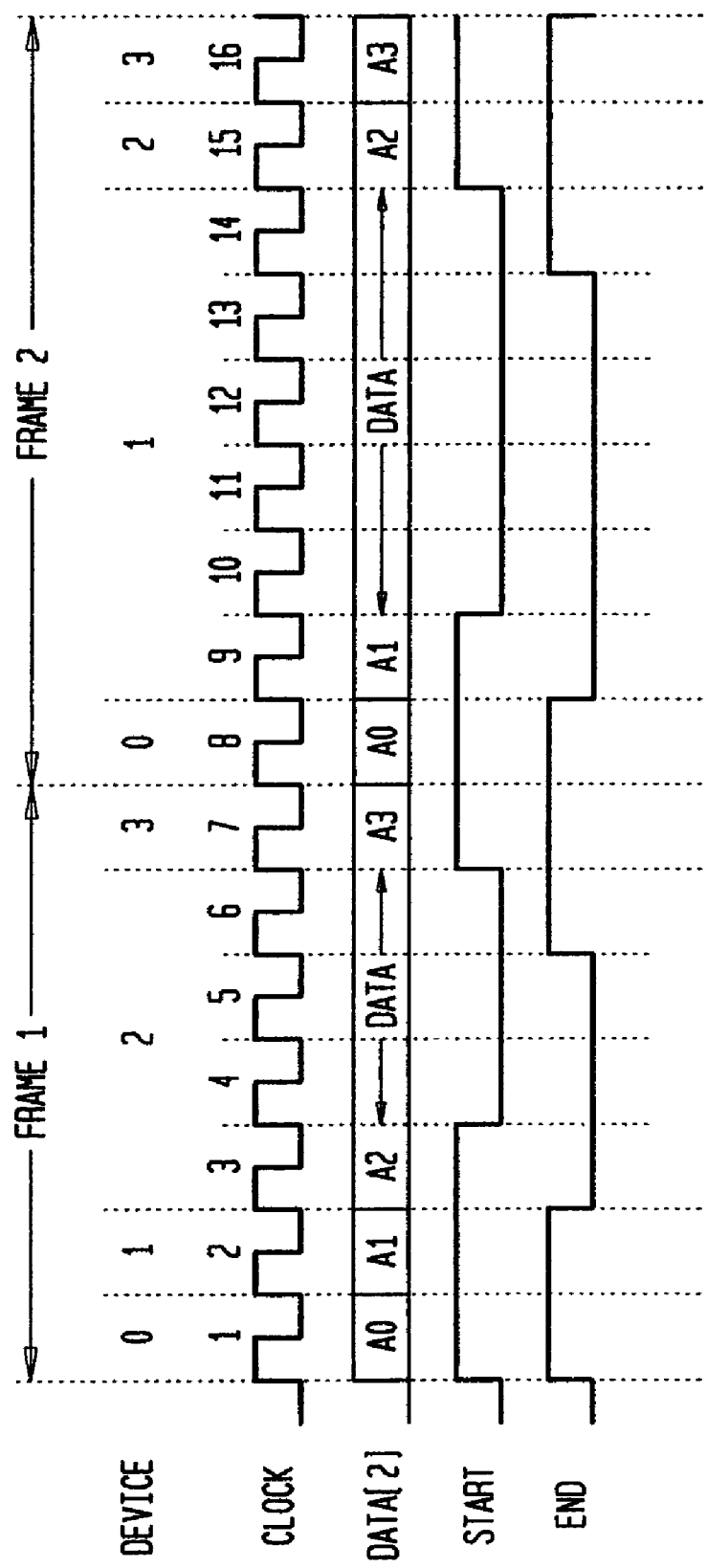
FIG. 4 is a timing diagram illustrating exemplary bus signals according to an alternative embodiment of the invention.

The operation of this embodiment of the invention may be further illustrated with reference to the timing diagram in FIG. 4. FIG. 4 depicts two frames of the bus (frame 1 and frame 2). In frame 1, device 2 has data to transmit, while devices 0, 1, and 3 do not. In frame 2, device 1 has data to transmit, while devices 0, 2 and 3 do not. As in the above example, when the system containing devices 0, 1, 2 and 3 is powered up, the device having the lowest bus address (e.g., device 0) is responsible for initiating the TDM sequence on the bus. Thus, during clock cycle 1 in FIG. 4, device 0 starts the cycle by placing its own address (address 0) onto the data lines of the bus and by transmitting a logical HIGH value (binary 1) on the first control line, representing a START signal. In this manner, devices 1, 2, and 3 are informed that device 0 has control of the bus. Simultaneously, in clock cycle 1, because device 0 has no need to transmit any data on the bus in the instant example, it indicates as much to the other devices by transmitting a logical LOW value (binary 0) on the second control line, representing an END signal, thus relinquishing control of the bus.

Meanwhile, device 1 has been monitoring the signals on the bus during clock cycle 1 of FIG. 4, and receives the address of device 0, the START signal on the first control line 105*b*, and the END signal on the second control line 105*d*. The interface logic in bus interface circuit 155 in device 1 thus recognizes that device 0 has asserted, and relinquished, control of the bus. Accordingly, in clock cycle 2, device 1 transmits its own bus address (address 1) on the data lines and asserts the START signal on the first control line 105*b*. Also during clock cycle 2, because device 1 also has no need to transmit any data on the bus in frame 1, it likewise transmits a logical LOW value (binary 0) on the second control line, representing an END signal, thus relinquishing control of the bus.

In clock cycle 3 of FIG. 4, device 2, having received the device 1's bus address and the START and END signals in clock cycle 2, takes control of the bus, transmitting its own bus address (address 2) and asserting the START signal in clock cycle 3. In clock cycles 4-6, it then proceeds to transmit its data. It should be noted that because there are two control lines, one for the START signal and one for the END signal, it is not necessary to maintain the START signal high throughout the entire data transmission during clock cycles 4-6, as in the embodiment described above. Finally, by asserting the END signal during clock cycle 6, device 2 informs the other devices that it has completed its data transfer and has no further need for the bus.

Next, control of the bus passes to device 3, which has no data to transfer during frame 1. Accordingly, in clock cycle 7, device 3 places its bus address (address 3) onto the data lines of the bus and asserts the START and END signals respectively on the first and second control lines 105*b*, 105*d*. Control of the bus thus returns to device 0, the next device in sequence. In frame 2, during clock cycles 8-16, the operation of the bus continues similarly, except that during clock cycles 8-16 device 1 is the only device with data to transfer.

Beneficially, in the present invention, the format in which any given device on bus 105 transmits data to another device on the bus is not limited to any particular format. Indeed, in a preferred embodiment of the invention, the device having data to transmit may control the data exchange format for the data it transmits. For example, a device having data to transmit might elect to transmit its data on a subset of the m data lines, rather than on all of the m data lines (e.g., a 4-bit parallel transmission rather than an 8-bit parallel transmission), or to transmit its data at a slower rate than the theoretical maximum rate. If so, the power required to transmit data on the bus will be lower than the power ordinarily needed to transmit on all the data lines or at the highest possible bus frequency.

In order to implement this embodiment of the invention, each device, before transmitting its data, transmits an identifier on the data lines signifying a predetermined data exchange protocol. Preferably, the identifier is encoded so that the identifier may be placed onto the data lines during a single clock cycle, and preferably the clock cycle immediately after the transmitting device places its bus address on the bus. It will further be recognize that the data to be transmitted may also include a handshaking signal from the transmitting device to the receiving device.

There has thus been described a low-latency, peer-to-peer TDM bus and associated bus protocol by which multiple devices may communicate without the presence of a bus master controller. It will be understood, however, that the foregoing description of the invention is by way of example only, and variations will be evident to those skilled in the art without departing from the scope of the invention, which is as set out in the appended claims.

What is claimed is:

1. A method for a first device to transmit data to a second device via a non-arbitrated digital bus comprising one or more control lines and one or more data lines, each device having a bus address and said digital bus having clock cycles, the method comprising the steps of:
   (1) receiving a bus seize signal originating from a device other than said first device;
   (2) receiving a predetermined bus address originating from said device other than said first device;
   (3) receiving a bus release signal originating from said device other than said first device; and
   (4) responsive to the receipt of said bus seize signal, said predetermined bus address and said bus release signal, seizing said digital bus;
   wherein said device other than said first device is not a bus arbiter, and
   wherein said bus release signal from said device other than said first device is received after said bus seize signal without the intervention of any other signals on said one or more control lines.

2. The method of claim 1, wherein the number of devices connected to said digital bus is less than or equal to $2^y$, where y is the number of data lines.

3. The method of claim 1, wherein step (4) comprises the steps of:
   (4a) asserting the bus address of said first device on said one or more data lines; and
   (4b) asserting a bus seize signal on said one or more control lines.

4. The method of claim 3, wherein step (4a) occurs in the clock cycle immediately after the receipt of said bus release signal from said device other than said first device.

5. The method of claim 3, wherein steps (4a) and (4b) occur simultaneously.

6. The method of claim 3, wherein the bus address of said first device is asserted in parallel on said one or more data lines, such that the entire bus address of said first device may be placed on said one or more data lines in a single clock cycle.

7. The method of claim 3, further comprising the step of:
   (5) asserting data intended for said second device on said one or more data lines.

8. The method of claim 7, further comprising the step of:
   (6) asserting a bus release signal on said one or more control lines.

9. The method of claim 8, wherein said first device asserts said bus release signal immediately after the clock cycle in which the last piece of data is asserted on said digital bus.

10. The method of claim 8, wherein said first device asserts said bus release signal in the same clock cycle in which the last piece of data is asserted on said digital bus.

11. The method of claim 8, wherein said one or more control lines comprise first and second control lines and wherein, when said first device has no data to transmit, it asserts said bus seize and bus release signals simultaneously on said first and second control lines, respectively.

12. The method of claim 8, wherein when said first device has no data to transmit, said first device asserts said bus seize and bus release signals in the clock cycle immediately after receipt of said bus release signal from said device other than said first device.

13. The method of claim 8, wherein said one or more control lines comprises a single control line and wherein said bus seize and bus release signals comprise opposite polarities on said single control line.

14. The method of claim 7, further comprising the step of:
   (6) before step (5), asserting the bus address of the second device on said one or more data lines, thereby indicating that the data asserted in step (5) is intended for the second device.

15. The method of claim 14, further comprising the step of:
   (7) asserting a signal on the one or more data lines that identifies a device-to-device data exchange protocol that may be used to exchange data between said first device and said second device.

16. The method of claim 7, wherein the data is asserted at a rate slower than the maximum transmission rate of the bus.

17. The method of claim 7, wherein the data is asserted on a subset of the one or more data lines.

18. The method of claim 1, wherein the predetermined bus address is a bus address of a third device connected to the digital bus.

19. The method of claim 1, wherein the predetermined bus address is related to the bus address of the first device by a predetermined function.

20. The method of claim 19, wherein the predetermined bus address equals the bus address of the first device plus or minus an integer number.

21. The method of claim 1, wherein said bus seize signal and said predetermined bus address are received in a single clock cycle of said digital bus.

22. A bus interface circuit for transmitting a message from a first device to a second device via a digital bus comprising one or more control lines and one or more data lines, each device having a bus address, said bus interface circuit comprising:
   (a) a bus monitor circuit connected to the one or more data lines and the one or more control lines of said digital bus;
   (b) a bus driver circuit connected to the one or more data lines and the one or more control lines of said digital bus; and
   (c) an interface control circuit, connected to said bus monitor circuit and to said bus driver circuit;

wherein said bus interface control circuit is configured to cause said bus driver circuit to seize said digital bus in response to said bus monitor receiving a predetermined bus address originating from a device other than said first device, a bus seize signal originating from said device other than said first device, and a bus release signal originating from said device other than said first device, wherein said device other than said first device is not a bus arbiter, and wherein said bus release signal from said device other than said first device is received after said bus seize signal without the intervention of any other signals on said one or more control lines.

23. The bus interface circuit of claim 22, wherein said bus interface control circuit is configured to cause said bus driver circuit to seize said digital bus by asserting the bus address of said first device on said one or more data lines and asserting a bus seize signal on said one or more control lines.

24. The bus interface circuit of claim 23, wherein said bus interface control circuit is further configured to cause said bus driver circuit to assert data intended for said second device on said one or more data lines.

25. The bus interface circuit of claim 24, wherein said bus interface control circuit is further configured to cause said bus driver circuit to assert a bus release signal on said one or more control lines.

26. The bus interface circuit of claim 25, wherein said one or more control lines comprise first and second control lines and wherein said interface control circuit is configured such that when said interface control circuit has no data to be transmitted, it causes said bus monitor circuit to assert said bus seize and bus release signals simultaneously on said first and second control lines, respectively.

27. The bus interface circuit of claim 25, wherein said one or more control lines comprises a single control line and wherein said bus seize and bus release signals comprise opposite polarities on said single control line.

28. The bus interface circuit of claim 22, wherein the predetermined bus address is related to the bus address of the first device by a predetermined function.

* * * * *